June 23, 1931. K. L. HANSEN 1,811,671
DYNAMO ELECTRIC MACHINE
Filed April 24, 1929 3 Sheets-Sheet 1

Inventor
Klaus L. Hansen
By Arthur R. Woolfolk
Attorney

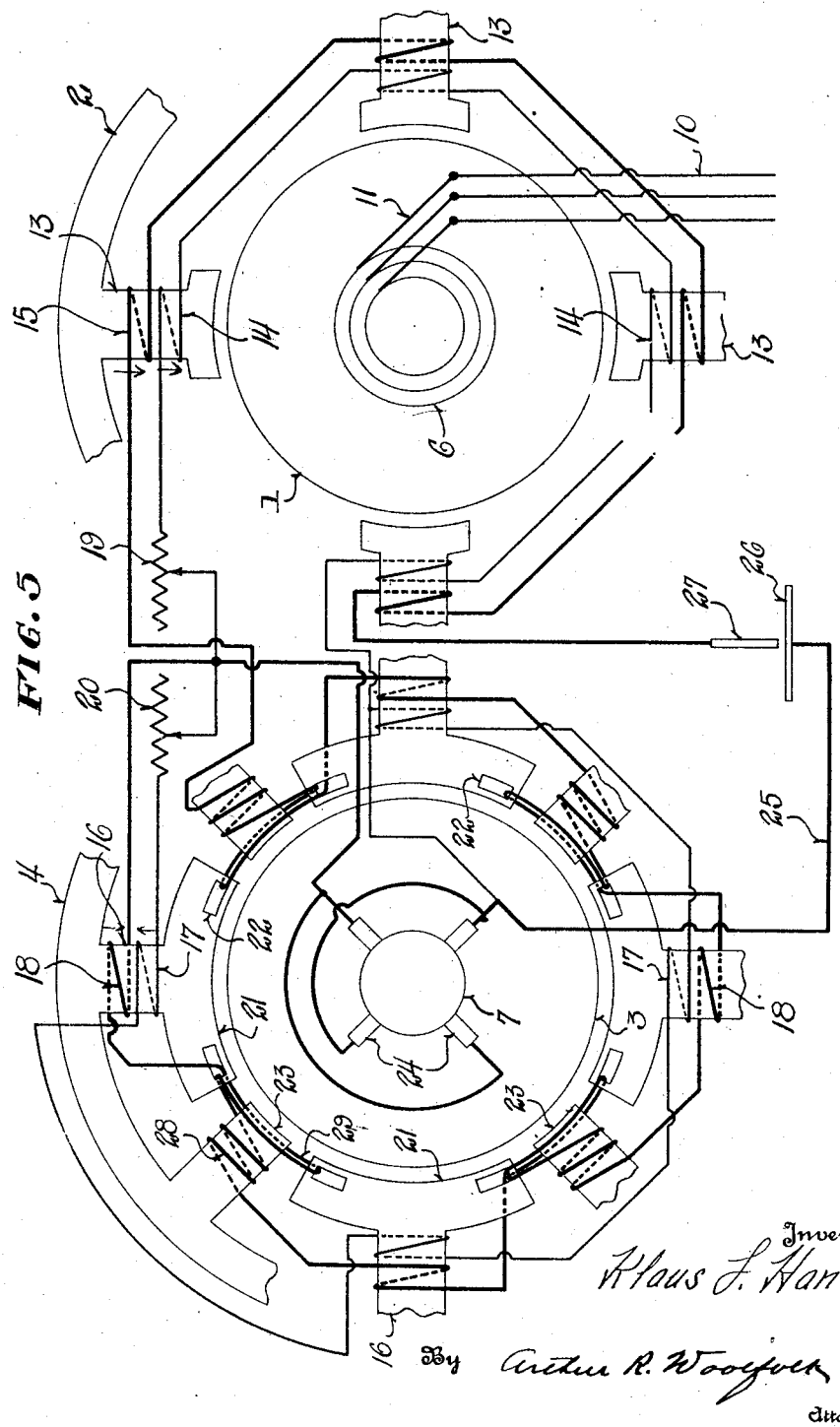

Patented June 23, 1931

1,811,671

UNITED STATES PATENT OFFICE

KLAUS L. HANSEN, OF MILWAUKEE, WISCONSIN

DYNAMO ELECTRIC MACHINE

Application filed April 24, 1929. Serial No. 357,633.

This invention relates to dynamo electric machines, and is particularly directed to a machine adapted to convert electrical energy from A. C. to D. C.

Various methods have been employed for effecting this conversion, and they may be roughly grouped as a synchronous converter, a dynamotor, a motor generator, and a motor converter.

The synchronous converter has an approximately fixed ratio of A. C. voltage to D. C. voltage, and if the D. C. voltage is varied through even a small range, the power factor is varied, which obviously is a disadvantage.

The dynamotor has the same defects as the synchronous converter, and, with its two distinct windings with their resistance losses and increased cost, has also the additional disadvantage of a lesser efficiency and increased cost.

The motor generator has an even lower efficiency than the dynamotor and a higher cost, and, in addition, requires two distinct machines: a motor and a dynamo, each of the full capacity at which the machine is rated. The entire energy is first converted into mechanical energy, and this mechanical energy is again converted into electrical energy, evidently materially reducing the efficiency and requiring a relatively large structure.

The motor converter, or as it is sometimes called, the cascade-converter, is a two-machine structure. One of the machines consists of a stator similar to the stator of an induction motor and cooperating with a wound rotor, the stator being the primary and the rotor being the secondary. The other machine has a stationary D. C. field structure cooperating with a rotor which is constructed in a manner identically similar to the armature of a rotary converter, such rotor being the primary with reference to the incoming A. C. energy supply. The frequency of the alternating current supplied the rotor of the second machine is always less than line frequency.

The motor converter shares with the dynamotor the lack of flexibility in varying the D. C. voltage without disturbing the power factor at the A. C. terminals.

In many cases, it is desirable to have a variable D. C. voltage, as, for example, in the Ward-Leonard system, arc welding, and other applications.

This invention is designed to overcome the defects of the machines described above, and objects of this invention are to provide a novel dynamo electric machine which converts A. C. to D. C., which has a high efficiency, which has great flexibility of control, which secures any desired ratio of A. C. voltage to D. C. voltage, which does not require a major transformation of electrical energy into mechanical energy, and then again into electrical energy, but which secures the desired transformation primarily by a transformer action while at the same time allowing independent control of the power factor and of the D. C. voltage.

While the invention in its broader aspects is not limited to an autotransformer action, nevertheless, the invention contemplates in one of its phases, the use of an autotransformer action which secures the additional increase in efficiency inherent in an autotransformer.

In greater detail objects of this invention are to provide a machine for converting electrical energy from A. C. to D. C., which is so constructed that the machine may readily be designed to provide a normal D. C. voltage equal to, greater, or less than that of the A. C. supply; in which the D. C. voltage may be varied through any range desired without altering the power factor; in which a part of the machine acts as a synchronous motor and cooperates with a second part of the machine which acts, not only as a generator, but also as a transformer, which may have any ratio desired between its primary and secondary windings; in which the winding of the A. C. machine is continued into the D. C. machine and forms the primary of the transformer, the secondary of the transformer being the winding of the D. C. generator, the fields in which the two parts of the A. C. winding operate being independent and separately controlled, so that the fields may be related in different manners to the varying load which the machine supplies.

In one phase of the invention it is contemplated providing connections between the A. C. winding and the D. C. winding, so that the effect is substantially that of a rotary converter although an autotransformer action is obtained, thereby materially increasing the efficiency of the machine.

Further objects are to provide a machine in which the major portion of the energy from the A. C. machine is transmitted electrically to the D. C. machine through the transformer action; in which the shaft transmits a slight torque; in which the winding common to both machines has a part located in the same slots with the secondary winding or direct current winding; and in which the field of the A. C. machine increases slightly with increase of load to maintain a substantially constant, predetermined power factor.

Further objects are to provide a machine which has a drooping external characteristic curve; which may have its open circuit voltage set at any desired predetermined value; which may be designed and adjusted to give any desired short circuit current; and in which a high impedance is inherently secured in the windings of the D. C. machine, both in the armature structure and in the field structure, to prevent momentary, large currents when the external resistance of the work circuit fluctuates rapidly, as in arc welding, to thereby secure a stable arc, thereby avoiding the necessity for the use of external stabilizing devices.

Further objects are to provide a dynamo electric machine in which a high impedance is secured in the armature structure of the machine itself, in which the D. C. machine has a large armature reaction, and also has a large demagnetizing action, thus aiding in securing a rapidly drooping characteristic curve, and to so design the dynamo electric machine that the direct current field structure may be provided with a shunt field and a bucking series field if desired, to also aid in producing the rapidly drooping characteristic curve.

Further objects are to provide a dynamo electric machine of the type described above in which the current in that portion of the A. C. winding which extends through the D. C. rotor acts to at least partially neutralize the effect of the current flowing in the D. C. winding, as these two windings are laid in the same slots; in which the A. C. winding has no effect on the demagnetizing action when the power factor is unity and the brushes are in neutral position; in which the power factor is not affected by the drop in the flux in the D. C. machine with increasing current, as the series field on the A. C. machine compensates and maintains the power factor at the value for which the machine is adjusted, for instance, at unity power factor; in which the shifting of the flux in the D. C. machine due to cross magnetization may be increased; and in which the armature of the D. C. machine has a large reactance which may itself be increased as desired by a proper design of the machine according to the disclosure of this invention; in which the compensating winding may be reduced; and in which the demagnetizing and cross magnetizing action may be increased as desired by shifting the brushes, provision being made for compensating this change in the alternating current machine by increasing its field strength, to thus maintain the power factor at the desired value.

Further objects are to provide a dynamo electric machine of the above described type in which all parts of the D. C. winding are affected by the A. C. winding, in which a shunt field and a differential series field may or may not be used on the direct current machine, in which the series field on the A. C. machine increases in strength with increase of delivered current sufficiently, first, to make up for the decrease in the shunt field on the A. C. machine, and second, to increase the voltage in the A. C. winding carried by the A. C. rotor to make up for the drop in the voltage of the A. C. winding carried by the direct current rotor, to thus maintain the voltage constant at the terminals of the A. C. winding although the load may vary.

Embodiments of the invention are shown in the accompanying drawings, in which:

Figure 5 is a view showing the connections of the field windings and the field structure of the two machines and the supply and work circuits.

Figure 6:
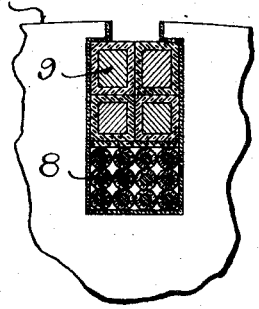

Figure 6 is a fragmentary sectional view through the rotor of the D. C. machine showing one manner of associating the A. C. and D. C. windings.

Figure 7:
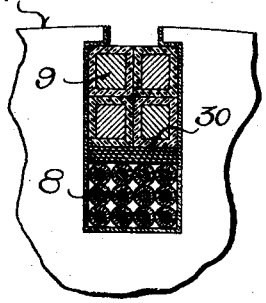

Figure 7 is a view similar to Figure 6, showing a further manner of associating the A. C. and D. C. windings.

Figure 1:
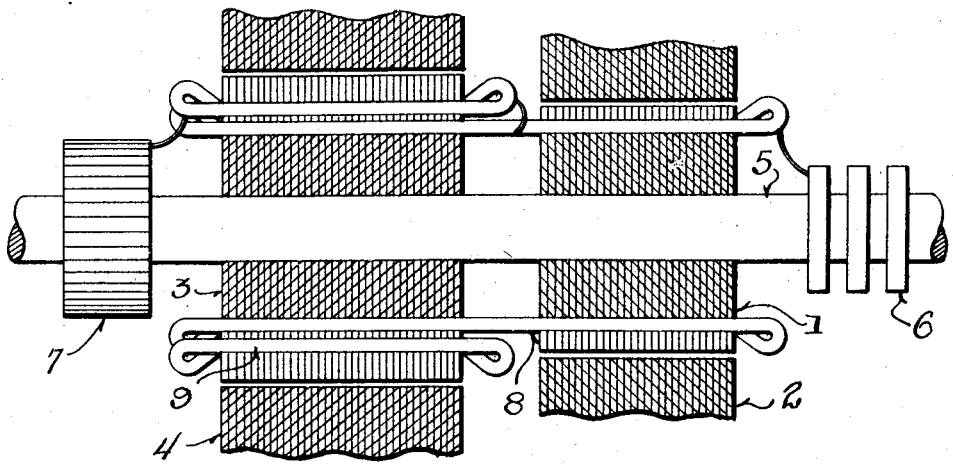
Figure 1 is a fragmentary sectional view through the rotors of the dynamo electric machine, such view also showing a portion of the stators.
Figure 2:
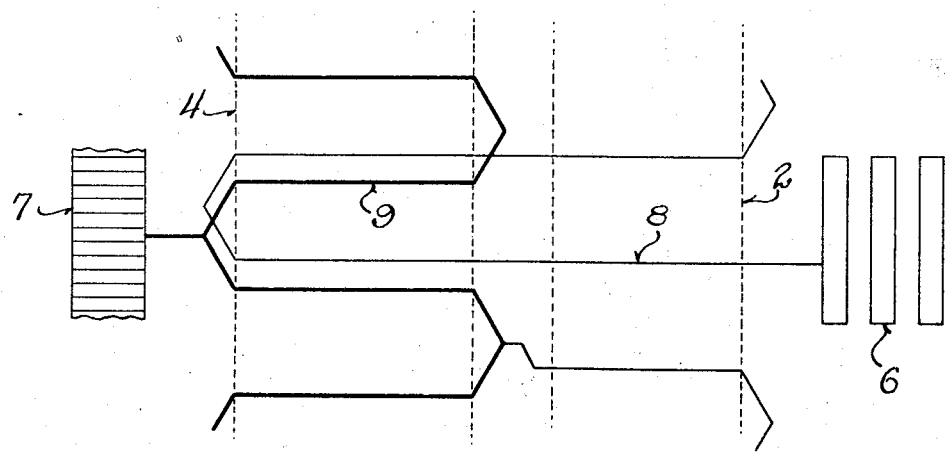
Figure 2 is a diagrammatic view in which the windings of the rotors are shown developed.
Figure 3:
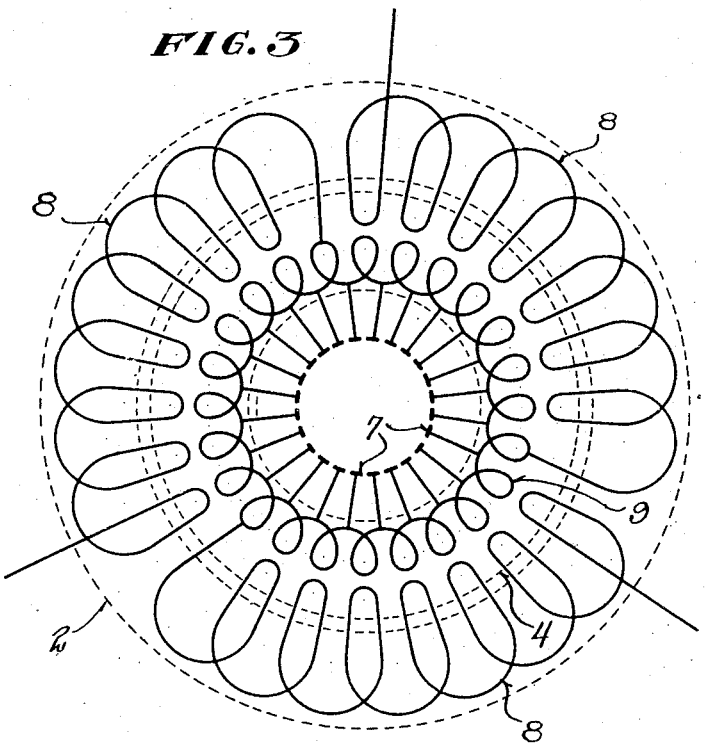
Figure 3 is a further diagrammatic view showing the relation of the windings in the two rotors to each other and to their field structures.

Referring to the drawings, particularly Figures 1, 2, and 3, it will be seen that the dynamo electric machine comprises an alternating current rotor 1 associated with a stator or field structure 2 and a direct current rotor 3 associated with a stator or field structure 4. The two rotors 1 and 3 are rigidly mounted upon a common shaft 5, which carries slip rings 6 at one end and a commutator 7 at the other end. The A. C. winding 8 extends through both rotors and in the D. C. rotor lies in the same slot with the D. C. winding 9. This construction is indicated in Figure 1 and shown very clearly in Figures 6 and 7. The D. C. winding is connected to the commutator 7 at regular intervals, and the A. C. winding is connected to the slip rings 6. In Figure 2 the relations existing between the windings 8 and 9 are shown as if the windings were developed, and the outline of the fields or stators is shown by dotted lines. In Figure 3 the windings have been shown diagrammatically, and the stators or field structures have been indicated by the dotted circles. From these figures it will be clearly seen that the A. C. winding operates in both fields and is associated with the D. C. winding, so that the portion of the A. C. winding in the D. C. rotor acts as the primary of a transformer, the secondary of such transformer being the D. C. winding.

In addition to this relation, it is apparent that the fields may be independently controlled, so that any desired relation may be obtained between the field strength and the varying load, thus providing for the independent control of the open circuit voltage and the short circuit current of the generator and the power factor of the A. C. machine or synchronous motor. It will be noted also that all portions of the D. C. winding are affected by the A. C. winding.

The form of invention shown in Figures 1, 2, and 3 contemplates the connecting of the A. C. winding to the D. C. winding, so that the A. C. winding is an open winding and has its ends connected at regular points to the D. C. winding. This connection produces two definite results, one of which is that the machine acts somewhat like a rotary converter, and the other of which is that an autotransformer action is produced. Both of these results improve the efficiency of the machine in a well known manner, as it is, of course, understood that the efficiency of a rotary converter is high, and also as it is to be appreciated that the inherent efficiency of an autotransformer is higher than that of a transformer having distinct and independent primaries and secondaries.

It is also apparent that line frequency is impressed upon both rotors, as the A. C. rotor operates as the rotor of a synchronous motor.

Figure 4:
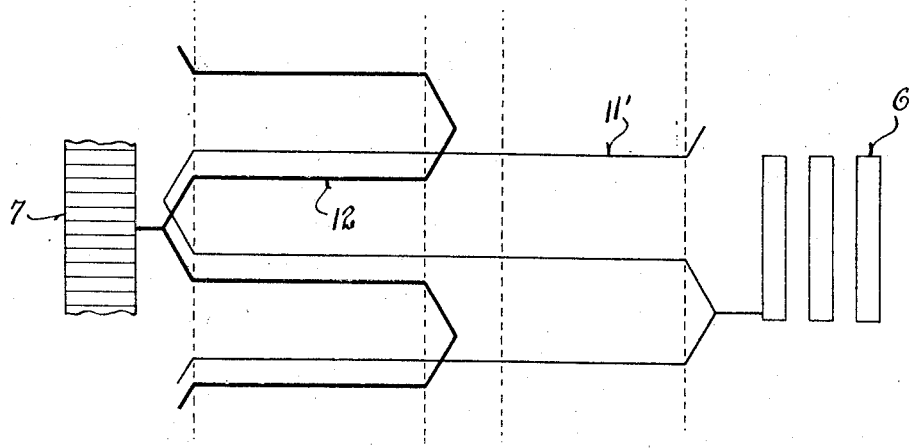
Figure 4 is a diagrammatic view similar to Figure 2, showing a further form of the invention, and showing the windings of the two rotors developed.

The A. C. winding may be separate and distinct from the D. C. winding if desired. For instance, as shown in Figure 4, the A. C. winding 11', although it lies in the same slots with the D. C. winding 12, is separate and distinct therefrom.

The field structures of the two machines are illustrated in Figure 5. It will be seen that the stator or field structure 2 of the A. C. machine is provided with a plurality of poles 13 which are equipped with shunt windings 14 and cumulative series windings 15. It is apparent that these windings may be on the same poles if desired, or may be on alternate poles.

The field 4 of the D. C. machine is provided with a plurality of poles 16 which may be supplied with shunt windings 17 and differential or bucking series windings 18. The shunt windings for the A. C. machine field are controlled by the rheostat 19, and the shunt windings for the D. C. machine are controlled by the rheostat 20.

The field poles of the D. C. machine are preferably provided with relatively large pole faces or pole shoes 21 provided with apertures 22 adjacent opposite ends. Interpoles or commutating poles 23 are provided between successive field poles.

The brushes 24 of the D. C. machine may be connected in pairs, and the work circuit 25 is supplied from these brushes, the work circuit including the work 26 and an electrode 27 when the device is used for arc welding. The series fields 18 and 15 are connected directly in series with the work circuit. In addition to this, a series winding 28 is placed upon each of the interpoles 23, and a reactance increasing winding 29 is threaded through the apertures 22 in the pole shoes, the windings 28 and 29 being in series with the work circuit. This construction is disclosed in my patent for a constant current generator for arc welding 1,418,707 of June 6th, 1922.

It is to be distinctly understood that either the shunt field 17 or the differential series field 18 of the direct current machine may be omitted if desired. Also it is possible to omit both windings and depend wholly upon armature reaction for setting up the field magnetism, although this latter arrangement is not the preferable form.

Assume that the machine is supplying a work circuit. Under these conditions the alternating current winding which extends through both rotors is influenced by both of the fields, that is to say, by the field of the A. C. machine and by the field of the D. C. machine. Assume, for instance, that the machine is adjusted for a given power factor. As the current in the work circuit increases, it is apparent that the differential series field on the direct current machine will reduce the flux produced by the shunt winding on the direct current machine and, consequently, will aid in producing a drooping characteristic. However, the total flux cut by the A. C. winding remains substantially constant, as the series field of the A. C. machine is cumulative in its action and increases the flux cut by the portion of the A. C. winding carried by the D. C. rotor. The terminal voltage of the A. C. winding is, therefore, maintained substantially constant and the power factor remains substantially unaltered. On the other hand, if the current should decrease in the work circuit, the effect of the series field of the A. C. machine will decrease and the flux and the field of the D. C. machine will increase, thus maintaining substantially constant the flux cut by the A. C. winding. In fact, the current supplied the work circuit may fluctuate rapidly and no detrimental effect is produced in the operation of the machine. The reactance increasing winding aids in preventing violent fluctuations of current, and this effect is enhanced by the reactance of the armature winding of the D. C. machine. The armature of the D. C. machine has a high armature reaction, and the construction is such that this effect is enhanced. Consequently, the reactance of the armature is relatively large, and this supplements the action of the reactance increasing winding so that a stable arc may be easily maintained.

The open circuit voltage of the D. C. machine and the short circuit voltage may be predetermined by the setting of the brushes and of the rheostats, and in addition to this, by the particular design of the machine. The adjustment of open circuit voltage and short circuit current is wholly independent of the adjustment for power factor of the A. C. machine. In addition to this, the entire A. C. winding passing through the two rotors is not affected by the current flowing in the D. C. winding. Only a portion of the A. C. winding is affected. Consequently, less effect is produced by a change in the field of the D. C. machine and by a change in the current flowing in the D. C. winding. Further, as pointed out previously, the total flux cut by the A. C. winding remains substantially constant for any given setting of the machine irrespective of the load supplied by the machine.

It is to be noted that the A. C. and the D. C. windings of the rotors are laid in the same slots in the rotor of the D. C. machine, as shown particularly in Figures 6 and 7. In these figures it will be seen that the A. C. winding 8 lies in the lower portion of the slot, and the D. C. winding lies in the upper portion thereof. There is a true transformer action between these windings. If desired, a magnetic bridge 30 of predetermined value may be placed across each slot between the D. C. winding and the A. C. winding, as shown in the modified form Figure 7. This magnetic bridge provides in effect a short circuit path for a part of the flux and, consequently, the armature reaction of the D. C. machine is greater in this form than in that shown in Figure 6. Thus the control of the two windings, namely, the A. C. winding and the D. C. winding of the rotors, is even more independent in the construction shown in Figure 7, and less effect is produced on the A. C. winding for any change in the setting of the D. C. machine.

The construction of the D. C. machine as fully described in my above identified patent is such that a large armature reaction is produced. Also a large demagnetizing action is produced. Thus a pronounced drooping characteristic is obtained. This drooping characteristic for the apparatus is augmented by the bucking series field of the D. C. machine. The cumulative series field of the A. C. machine increases in strength as the current supplied the work circuit increases sufficiently, first, to make up for the drop of the shunt field in the A. C. machine, and second, so as to increase the voltage in the part of the A. C. winding carried by the A. C. rotor, to thus maintain the voltage substantially constant at the terminals of the A. C. winding, that is to say, at the slip rings.

It is to be noted that a part of the magneto motive force from the current flowing in the D. C. winding is neutralized by the current flowing in the A. C. winding. Consequently, less winding is required upon the commutating poles. However, it is to be noted also that the demagnetizing action of the D. C. winding is not materially affected by this neutralizing action. This neutralizing action is lessened by the magnetic bridge structure as shown in Figure 7.

It will be seen that a novel form of dynamo electric machine has been provided, which is very efficient in operation, which does not require the use of external stabilizers, which is relatively simple in construction, and lends itself readily to ordinary machine shop practices, both in construction and assembly, and which may be made relatively small for any given output, or in other words, for any given rating.

Further, it will be seen that the utmost flexibility of control is obtained, so that the short circuit current and open voltage current of the D. C. machine may be controlled independently of the control of the power factor of the A. C. machine.

For the sake of convenience and to avoid needless repetition in the claims, the winding connected to the commutator is called a direct current winding and the winding connected to the slip rings is called an alternating current winding. These expressions appearing in the claims are used to designate these two windings and, as stated, are used to avoid a more cumbersome and wordy detailing of such windings in the claims.

Although the invention has been described in considerable detail, such description is intended as illustrative rather than limiting, as the invention may be variously embodied and as the scope of such invention is to be determined as claimed.

I claim:

1. In a dynamo electric machine, the combination of a direct current rotor, an alternating current rotor, a direct current winding carried by said direct current rotor, an alternating current winding carried jointly by both of said rotors, means for maintaining a substantially constant, predetermined, effective total field in which said alternating current winding operates, and means for producing a variable field in which said direct current winding operates.

2. In a dynamo electric machine, the combination of a direct current rotor, an alternating current rotor, a direct current winding carried by said direct current rotor, an alternating current winding carried jointly by both of said rotors, means for maintaining a substantially constant, predetermined, effective total field in which said alternating current winding operates, and means for producing a variable field in which said direct current winding operates, said alternating current winding and said direct current winding being inductively coupled.

3. A dynamo electric machine comprising a direct current rotor, a field structure associated therewith, an alternating current rotor, a field structure associated therewith, an alternating current winding carried by each rotor, a direct current winding carried by the direct current rotor and inductively coupled to that portion of the alternating current winding carried by the direct current rotor, a shunt field and a cumulative series field winding carried by the field structure associated with said alternating current rotor, said field windings being supplied by said direct current winding.

4. A dynamo electric machine comprising a direct current rotor, a field structure associated therewith, an alternating current rotor, a field structure associated therewith, an alternating current winding carried by each rotor, a direct current winding carried by the direct current rotor and inductively coupled to that portion of the alternating current winding carried by the direct current rotor, a shunt field and a cumulative series field winding carried by the field structure associated with said alternating current rotor, said field windings being supplied by said direct current winding, a field winding for the field structure associated with the direct current rotor, and means for independently controlling the fields associated with the two rotors.

In testimony whereof, the signature of the inventor is affixed hereto.

KLAUS L. HANSEN.